United States Patent
Millington et al.

(10) Patent No.: US 11,288,766 B2
(45) Date of Patent: Mar. 29, 2022

(54) SYSTEM AND METHOD FOR DISPLAYING HIGH QUALITY IMAGES ON CONTROLS BASED ON DISPLAY SCALING

(71) Applicant: Embarcadero Technologies, Inc., Austin, TX (US)

(72) Inventors: David Millington, Tallinn (EE); Alexey Sharagin, Ulan-Ude (RU)

(73) Assignee: Embarcadero Technologies, Inc., Austin, TX (US)

( * ) Notice: Subject to any disclaimer, the term of this patent is extended or adjusted under 35 U.S.C. 154(b) by 28 days.

(21) Appl. No.: 16/899,372

(22) Filed: Jun. 11, 2020

(65) Prior Publication Data

US 2021/0004931 A1 Jan. 7, 2021

Related U.S. Application Data

(60) Provisional application No. 62/869,395, filed on Jul. 1, 2019.

(51) Int. Cl.
*G06T 3/40* (2006.01)
*G06F 3/0482* (2013.01)

(52) U.S. Cl.
CPC .............. *G06T 3/40* (2013.01); *G06F 3/0482* (2013.01); *G06T 2200/24* (2013.01); *G06T 2210/62* (2013.01)

(58) Field of Classification Search
CPC ... G06T 3/40; G06T 2200/24; G06T 2210/62; G06F 3/0482
See application file for complete search history.

(56) References Cited

U.S. PATENT DOCUMENTS

| | | | |
|---|---|---|---|
| 2012/0206492 A1* | 8/2012 | Fukui | G06F 3/048 345/660 |
| 2015/0379685 A1* | 12/2015 | Kobayashi | G06T 3/20 345/662 |
| 2018/0276505 A1* | 9/2018 | Tonouchi | G06K 9/3258 |

* cited by examiner

*Primary Examiner* — Michelle L Sams
(74) *Attorney, Agent, or Firm* — Foley & Lardner LLP

(57) ABSTRACT

A graphical user interface (GUI) includes an image list associated with a display component of a display device. The image list has an index of logical images, where each of the logical images has a fixed pixel size. The GUI further includes an image container connected to the image list, where the image container comprises a plurality of different size versions of at least some of the logical images. The GUI further includes one or more control objects, where each of the control objects is configured to draw a corresponding image from the index of logical images of the image list. The GUI is configured to update the index of logical images of the image list with the different size versions sourced from the image container in response to a scale change of the display component.

21 Claims, 8 Drawing Sheets

SYSTEM AND METHOD FOR DISPLAYING HIGH QUALITY IMAGES ON CONTROLS BASED ON DISPLAY SCALING

CROSS-REFERENCE TO RELATED APPLICATIONS AND CLAIM OF PRIORITY

This application claims the benefit of U.S. Provisional Application No. 62/869,395, filed Jul. 1, 2019, the content of which are fully incorporated herein by reference in its entirety.

BACKGROUND

The present disclosure relates generally to a user interface (UI) system. The present disclosure relates more particularly to systems and methods for providing different sized images for display on controls of a UI according to scaling of a display (e.g., display device, screen, window, module, component, and/or the like).

Generally, a graphical user interface (GUI) for a computer application or computer program displays graphics or images on various controls, such as, for example, on toolbars, on buttons, next to menu items, and the like. These graphics and images may be contained in a list (e.g., an image list), and the controls are connected to the list, such that the graphics and images are drawn from an index (e.g., image 1, image 2, image 3, etc.) in the list. For example, a button on the GUI may draw from image 5 (e.g., an image corresponding to index 5) in the list, while several menu items on the GUI may draw from images 11, 100, and 53 (e.g., images corresponding to index 11, index 100, and index 53) in the list.

However, some systems and devices allow for only images of a fixed pixel size in the list, which may cause problems when displaying the images on modern display devices having higher resolutions (e.g., high DPI displays, retina displays, and the like). For example, some Windows operating systems provided by Microsoft Corporation of Redmond, Wash., use image lists to enable management of a large set of graphics (or bitmaps). These image lists are a collection of images, each having the same pixel size that are contained in a single wide bitmap, and each of the images are drawn from its index. Thus, instead of referencing an image stored on a file system, for example, the images are effectively coded into the image list. Management of these image lists are accomplished using various image list functions that may be enabled via an application programming interface (API), for example, such as Microsoft Win32API, and various handles (e.g., an HIMAGELIST handle) may be used to access these image lists.

While such image lists provide for efficient management of a large number of images that are used on various controls of a GUI, these image lists do not include support for providing different sized images dependent on the display scaling. Instead, when a display is scaled, the images may be drawn too small (such that they appear smaller on the scaled display), or may be drawn to appear physically larger using more pixels. For example, an image list configured to hold 16×16 sized images allows for only images having a 16×16 pixel size in the image list. In this case, for a display at 200% scaling, a 16×16 sized image may be rendered in twice the number of pixels vertically and horizontally, such that the image will be drawn to appear larger on the display screen. For example, a 16×16 sized image from the image list may be drawn with 32×32 pixels on the display screen at 200% scaling. However, when an image intended for a smaller pixel size is drawn with more pixels to appear physically larger on the display screen, the image can appear distorted, blurred, and/or pixelated.

Accordingly, systems and methods for automatically providing images of a desired size (e.g., pixel size) according to scaling of the display screen or window may be desired.

The above information disclosed in this Background section is for enhancement of understanding of the background of the invention, and therefore, it may contain information that does not constitute prior art.

SUMMARY

Example embodiments relate to a graphical user interface (GUI) having an image list associated with a display component of a display device, where the image list has an index of logical images, each of the logical images having a fixed pixel size. The GUI also has an image container connected to the image list, where the image container includes a plurality of different size versions of at least some of the logical images. The GUI also has one or more control objects, where each of the control objects is configured to draw a corresponding image from the index of logical images of the image list. The GUI is configured to update the index of logical images of the image list with the different size versions sourced from the image container in response to a scale change of the display component.

In further examples, each of the control objects is configured to draw a corresponding different size version of the logical images in response to the update of the image list.

In further examples, each of the different size versions of the logical images have the same aspect ratio, and each different size version of a corresponding logical image has a different pixel size than those of other different size versions of the corresponding logical image.

In further examples, the GUI is configured to: compare the pixel size of each of the different size versions of a corresponding logical image with a scaled pixel size corresponding to the scale change; and determine whether the different size versions of the corresponding logical image include a version having the scaled pixel size.

In further examples, the GUI is further configured to: identify a version from among the different size versions of the corresponding logical image that includes the scaled pixel size; and in response to identifying the version having the scaled pixel size, re-populate a corresponding image in the index of the image list with the version having the scaled pixel size.

In further examples, the GUI is further configured to: determine that none of the different size versions of the corresponding logical image includes the scaled pixel size; downscale one of the different sized versions of the corresponding logical image having a pixel size that is greater than the scaled pixel size to generate a downscaled version of the corresponding logical image having the scaled pixel size; and re-populate a corresponding image in the index of the image list with the downscaled version having the scaled pixel size.

Further example embodiments relate to a system for displaying graphics on controls of a GUI, where the system includes a display device configured to display the GUI; one or more processors; and memory coupled to the one or more processors and storing instructions. The instructions, when executed by the one or more processors, cause the one or more processors to: receive an indication of a scale change of a display component of the display device, the display component displaying the GUI; identify an image list associated with the display component, the image list having an index of logical images, each of the logical images having a fixed pixel size; identify an image container connected to the image list, the image container comprising a plurality of different size versions of at least some of the logical images; update each entry of the logical images in the image list with the different size versions sourced from the image container in response to the scale change of the display component; and redraw a graphic for a control object in the GUI from the updated image list, the graphic corresponding to one of the different size versions in the updated image list.

In further examples of the system, each of the different size versions of the logical images have the same aspect ratio, and each different size version of a corresponding logical image has a different pixel size than those of other different size versions of the corresponding logical image.

In further examples of the system, the instructions further cause the one or more processors to: identify a pixel size of the logical images in the index of the image list; calculate a scaled pixel size based on the scale change and the pixel size of the logical images; and retrieve the different size versions of the logical images from the image container corresponding to the scaled pixel size.

In further examples of the system, to retrieve the different size versions of the logical images from the image container, the instructions further cause the one or more processors to: compare the pixel size of each of the different size versions of a corresponding logical image with the scaled pixel size; and determine whether the different size versions of the corresponding logical image include a version having the scaled pixel size.

In further examples of the system, the instructions further cause the one or more processors to: identify a version from among the different size versions of the corresponding logical image that includes the scaled pixel size; and in response to identifying the version having the scaled pixel size, re-populate a corresponding image in the index of the image list with the version having the scaled pixel size.

In further examples of the system, the instructions further cause the one or more processors to: determine that none of the different size versions of the corresponding logical image includes the scaled pixel size; downscale one of the different sized versions of the corresponding logical image having a pixel size that is greater than the scaled pixel size to generate a downscaled version of the corresponding logical image having the scaled pixel size; and re-populate a corresponding image in the index of the image list with the downscaled version having the scaled pixel size.

Further examples embodiments relate to a method for displaying graphics on controls of a GUI. In such examples, the method includes: receiving, by a processor, an indication of a scale change of a display component of a display device, the display component displaying the GUI; identifying, by the processor, an image list associated with the display component, the image list having an index of logical images, each of the logical images having a fixed pixel size; identifying, by the processor, an image container connected to the image list, the image container comprising a plurality of different size versions of at least some of the logical images; updating, by the processor, the index of the image list with the different size versions sourced from the image container in response to the scale change of the display component; and redrawing, by the processor, a graphic for a control object in the GUI from the updated image list, the graphic corresponding to one of the different size versions in the updated image list.

In further examples of the method, each of the different size versions of the logical images have the same aspect ratio, and each different size version of a corresponding logical image has a different pixel size than those of other different size versions of the corresponding logical image.

In further examples, the method includes: identifying, by the processor, a pixel size of the logical images in the index of the image list; calculating, by the processor, a scaled pixel size based on the scale change and the pixel size of the logical images; and retrieving, by the processor, the different size versions of the logical images from the image container corresponding to the scaled pixel size.

In further examples of the method, to retrieve the different size versions of the logical images from the image container, the method further comprises: comparing, by the processor, the pixel size of each of the different size versions of a corresponding logical image with the scaled pixel size; and determining, by the processor, whether the different size versions of the corresponding logical image include a version having the scaled pixel size.

In further examples, the method includes: identifying, by the processor, a version from among the different size versions of the corresponding logical image that includes the scaled pixel size; and in response to identifying the version having the scaled pixel size, re-populating, by the processor, a corresponding image in the index of the image list with the version having the scaled pixel size.

In further examples, the method includes: determining, by the processor, that none of the different size versions of the corresponding logical image includes the scaled pixel size; downscaling, by the processor, one of the different sized versions of the corresponding logical image having a pixel size that is greater than the scaled pixel size to generate a downscaled version of the corresponding logical image having the scaled pixel size; and re-populating, by the processor, a corresponding image in the index of the image list with the downscaled version having the scaled pixel size.

In further examples of the method, the image list is configured to modify at least one of the different size versions of the logical images sourced from the image container to be drawn semi-transparent or in grayscale.

In further examples of the method, the instructions further cause the one or more processors to modify at least one of the different size versions of the logical images sourced from the image container.

In further examples, the method includes modifying, by the processor, at least one of the different size versions of the logical images sourced from the image container.

DETAILED DESCRIPTION

Figure 1:
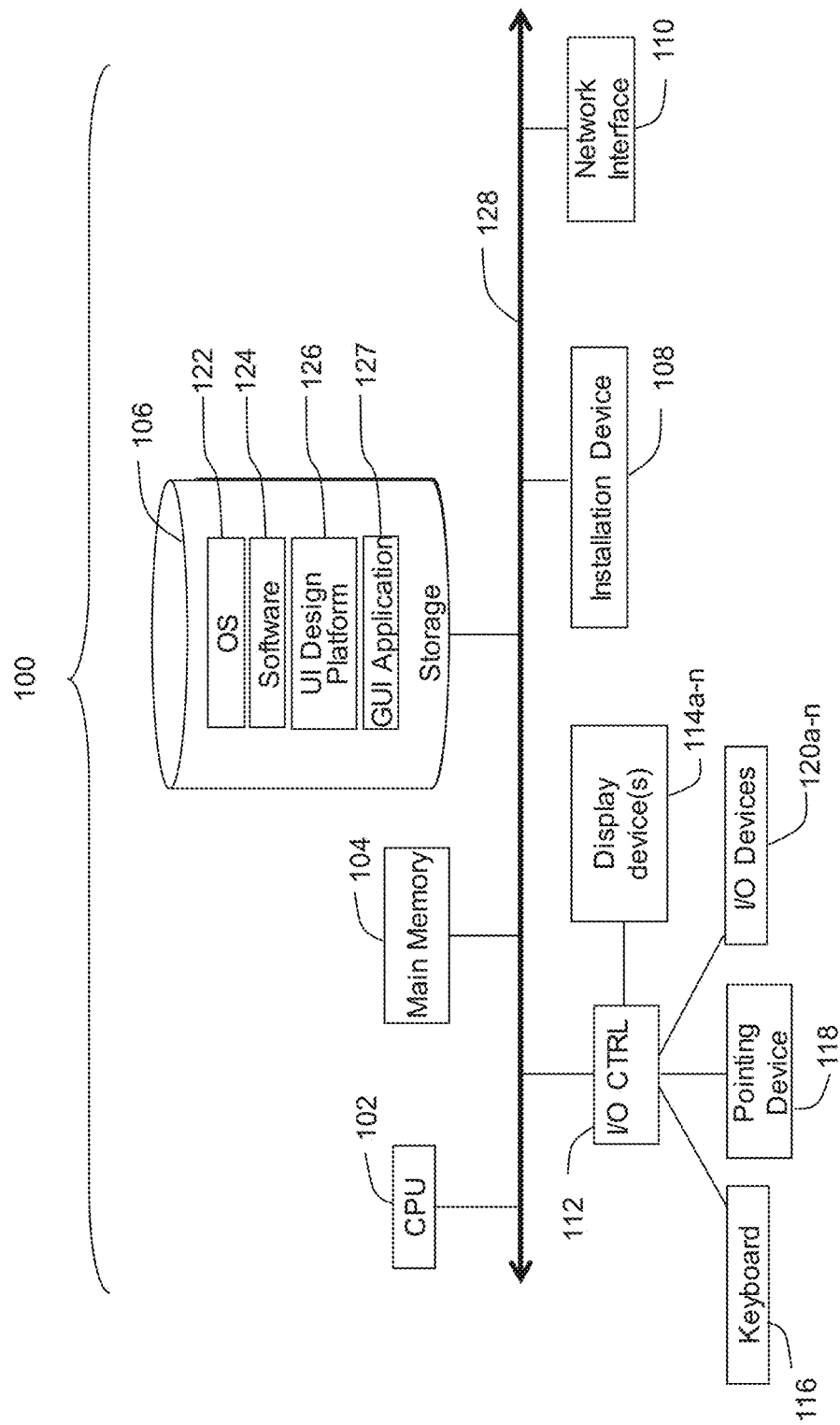
FIG. 1 is a block diagram of a computing device, according to some embodiments.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description.

Computing Device

Referring now to FIG. 1, a block diagram of a computing device is shown, according to some embodiments. The computing device 100 may be useful for practicing one or more embodiments of the present disclosure. As shown in FIG. 1, in some embodiments, the computing device 100 includes a central processing unit 102, a main memory unit 104, a storage device 106, an installation device 108, a network interface 110, an input/output (I/O) controller 112, one or more display devices 114 (e.g., 114a-114n), a keyboard 116, and a pointing device 118 (e.g., a mouse). The storage device 106 may include, without limitation, an operating system (OS) 122, software 124, a software instance of a UI design platform (or tool) 126, and a GUI application 127. The computing device 100 may also include additional optional elements, for example, such as a memory port, a bridge, one or more input/output devices 120 (e.g., 120a-120n), and cache memory in communication with the central processing unit 102.

In some embodiments, the central processing unit 102 may be any suitable logic circuitry that responds to and processes instructions fetched from the main memory unit 104. In some embodiments, the central processing unit 102 is provided by a microprocessor unit. For example, in some embodiments, the microprocessor unit may include one or more microprocessors manufactured by Intel Corporation of Mountain View, Calif., Motorola Corporation of Schaumburg, Ill., the ARM processor and TEGRA system on a chip (SoC) manufactured by Nvidia of Santa Clara, Calif., the POWER7 processor, those manufactured by International Business Machines of White Plains, N.Y., and/or by Advanced Micro Devices of Sunnyvale, Calif. The computing device 100 may be based on any of these processors, or any other suitable processor capable of operating as described herein. In various embodiments, the central processing unit 102 may utilize instruction level parallelism, thread level parallelism, different levels of cache, and/or multi-core processors. A multi-core processor may include two or more processing units on a single computing component. Examples of a multi-core processors include the AMD PHENOM IIX2, INTEL CORE i5 and INTEL CORE i7.

In some embodiments, the main memory unit 104 may include one or more memory chips capable of storing data and allowing any storage location to be directly accessed by the central processing unit 102. In some embodiments, the main memory unit 104 may be volatile and faster than the storage device 106. In various embodiments, the main memory unit 104 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), and/or Extreme Data Rate DRAM (XDR DRAM). In some embodiments, the main memory 104 or the storage device 106 may be non-volatile memory, for example, such as non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), and/or Millipede memory. The main memory 104 may be based on any of the above described memory chips, or any other available memory chips capable of operating as described herein. In some embodiments, the central processing unit 102 communicates with the main memory unit 104 via a system bus 128 (described in more detail below). In other embodiments, the central processing unit 102 may communicate directly with the main memory unit 104 via a memory port.

In some embodiments, the central processing unit 102 may communicate directly with cache memory via a secondary bus, sometimes referred to as a backside bus. In other embodiments, the central processing unit 102 may communicate with cache memory using the system bus 128. Cache memory typically has a faster response time than the main memory unit 104, and is typically provided by SRAM, BSRAM, or EDRAM. In some embodiments, the central processing unit 102 communicates with various I/O devices 120 via a local system bus (e.g., the system bus 128). Various buses may be used to connect the central processing unit 102 to any of the I/O devices 120, including a PCI bus, a PCI-X bus, or a PCI-Express bus, or a NuBus. In embodiments in which the I/O devices 120 include a video display device 114, the central processing unit 102 may use an Advanced Graphics Port (AGP) to communicate with the display device 114 or the I/O controller 112 for the display device 114.

In various embodiments, a wide variety of I/O devices 120a-120n may be included in the computing device 100. For example, in various embodiments, the input devices of the I/O devices 120a-n may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various embodiments, the output devices of the I/O devices 120a-n may include, for example, video displays, graphical displays, speakers, headphones, inkjet printers, laser printers, and/or 3D printers.

In some embodiments, I/O devices 120a-120n may include a combination of multiple input or output devices, such as, for example, Microsoft KINECT, Nintendo Wiimote for the WII, Nintendo WII U GAMEPAD, Apple IPHONE, Android based smart phones, and/or the like. In some embodiments, some of the I/O devices 120a-120n may allow gesture recognition inputs through a combination of some of the inputs and outputs. In some embodiments, some of the I/O devices 120a-120n may provide for facial recognition, which may be utilized as an input for different purposes including authentication and other commands. In some embodiments, some of the I/O devices 120a-120n may provide for voice recognition and inputs, such as, for example, Microsoft KINECT, SIRI for IPHONE by Apple, Google Now or Google Voice Search, and/or the like.

In some embodiments, addition I/O devices 120a-120n may have both input and output capabilities, including, for example, haptic feedback devices, touchscreen displays, multi-touch displays, and/or the like. Touchscreen, multi-touch displays, touchpads, touch mice, or other touch sensing devices may use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices may allow two or more contact points with the surface, allowing advanced functionality including, for example, pinch, spread, rotate, scroll, and/or other gestures. Some touchscreen devices, including, for example, Microsoft PIXELSENSE and Multi-Touch Collaboration Wall, may have larger surfaces, such as on a table-top or on a wall, and may also interact with other electronic devices. In some embodiments, some of the I/O devices 120a-120n, display devices 114a-114n, or group of devices may be augment reality devices. In some embodiments, the I/O devices (e.g., keyboard 116, pointing device 118, display devices 114, and/or I/O devices 120) may be controlled by the I/O controller 112. In some embodiments, an I/O device may also provide storage and/or an installation medium (e.g., installation device 108) for the computing device 100. In still other embodiments, the computing device 100 may provide USB connections to receive handheld USB storage devices. In further embodiments, an I/O device 120 may be a bridge between the system bus 128 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some embodiments, the display devices 114a-114n may be connected to the I/O controller 112. In various embodiments, the display devices 114a-114n may include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays may include, for example, stereoscopy, polarization filters, active shutters, autostereoscopy, and/or the like. Display devices 114a-114n may also include a head-mounted display (HMD). In some embodiments, display devices 114a-114n or the corresponding I/O controllers 112 may be controlled through or have hardware support for OPENGL, DIRECTX API, and/or other graphics libraries.

In some embodiments, the computing device 100 may include or connect to multiple display devices 114a-114n, which each may be of the same or different type and/or form. As such, any of the I/O devices 120a-120n and/or the I/O controller 112 may include any type and/or form of suitable hardware, software, or combination of hardware and software to support, enable or provide for the connection and use of multiple display devices 114a-114n by the computing device 100. For example, the computing device 100 may include any type and/or form of video adapter, video card, driver, and/or library to interface, communicate, connect or otherwise use the display devices 114a-114n. In one embodiment, a video adapter may include multiple connectors to interface to multiple display devices 114a-114n. In other embodiments, the computing device 100 may include multiple video adapters, with each video adapter connected to one or more of the display devices 114a-114n. In some embodiments, any portion of the operating system 122 of the computing device 100 may be configured for using multiple displays 114a-114n. In other embodiments, one or more of the display devices 114a-114n may be provided by one or more other computing devices connected to the computing device 100, via a network. In some embodiments software may be designed and constructed to use another computer's display device as a second display device 114a for the computing device 100. For example, in one embodiment, an Apple iPad may connect to a computing device 100 and use the display of the computing device 100 as an additional display screen that may be used as an extended desktop. One of ordinarily skill in the art will recognize and appreciate the various ways and embodiments that a computing device 100 may be configured to have multiple display devices 114a-114n.

In some embodiments, the storage device 106 (e.g. one or more hard disk drives or redundant arrays of independent disks) may store the operating system 122, and/or other related software, and may store application software programs such as any program related to the software instance of the UI design platform 126. Examples of the storage device 106 may include hard disk drive (HDD), optical drive including CD drive, DVD drive, and/or BLU-RAY drive, solid-state drive (SSD), USB flash drive, and/or any other suitable device for storing data. Some storage devices 106 may include multiple volatile and non-volatile memories, such as, for example, solid state hybrid drives that combine hard disks with solid state cache. Some storage devices 106 may include non-volatile, mutable, and/or read-only. Some storage devices 106 may be internal and may connect to the computing device 100 via the bus 128. Some storage devices 106 may be external and may be connect to the computing device 100 via an I/O device 120 that provides an external bus. Some storage devices 106 may connect to the computing device 100 via the network interface 110 over a network, such as, for example, the Remote Disk for MACBOOK AIR by Apple. Some computing devices 100 may not require a non-volatile storage device 106 and may be thin clients or zero clients. Some storage devices 106 may also be used as an installation device 108, and may be suitable for installing software and programs. Additionally, the operating system and the software can be run from a bootable medium, for example, such as a bootable CD (e.g. KNOPPIX), which may be a bootable CD for GNU/Linux that is available as a GNU/Linux distribution from knoppix.net.

In some embodiments, the computing device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on the computing device 100. An application distribution platform may include a repository of applications on a server or a cloud, which the computing device 100 may access over a network (e.g., the Internet). An application distribution platform may include application developed and provided by various developers. A user of the computing device 100 may select, purchase, and/or download an application via the application distribution platform.

In some embodiments, the computing device 100 may include the network interface 110 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11/b/g/n/ac CDMA, GSM, WiMax and direct asynchronous connections). In one embodiment, the computing device 100 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some embodiments, the network interface 110 may include, for example, a built-in network adapter, network interface card, PCMCIA network card, EXPRESSCARD network card, card bus network adapter, wireless network adapter, USB network adapter, modem, and/or any other suitable device for interfacing the computing device 100 to any type of network capable of communication and performing the operations described herein.

In some embodiments, the computing device 100 may operate under the control of the operating system 122, which controls scheduling of tasks and access to system resources. In various embodiments, the computing device 100 may run any suitable operating system 122, such as, for example, any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, and/or any other suitable operating system capable of running on the computing device 100 and performing the operations described herein. Some examples of operating systems 122 include, but are not limited to: WINDOWS 2000, WINDOWS Server 2012, WINDOWS CE, WINDOWS Phone, WINDOWS XP, WINDOWS VISTA, WINDOWS 7, WINDOWS RT, WINDOWS 8, WINDOWS 10, and/or the like, all of which are manufactured by Microsoft Corporation of Redmond, Wash.; MAC OS and iOS, manufactured by Apple, Inc. of Cupertino, Calif.; Linux, a freely-available operating system, e.g. Linux Mint distribution ("distro") or Ubuntu, distributed by Canonical Ltd. of London, United Kingdom; Unix or other Unix-like derivative operating systems; and Android, designed by Google, of Mountain View, Calif., but may include others. Some operating systems 122, including, for example, the CHROME OS by Google, may be used on zero clients or thin clients (e.g., CHROMEBOOKS).

In various embodiments, the computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, and/or any other suitable type and/or form of computing, telecommunications, or media device that is capable of communication. The computing device 100 has sufficient processor power and memory capacity to perform the operations described herein. In some embodiments, the computing device 100 may have different processors, operating systems, and input devices consistent with the device.

In some embodiments, the computing device 100 may be a gaming system. For example, the computing device 100 may include a PLAYSTATION (1, 2, 3, 4, and/or the like), a PERSONAL PLAYSTATION PORTABLE (PSP), and/or a PLAYSTATION VITA device manufactured by the Sony Corporation of Tokyo, Japan, a NINTENDO DS, NINTENDO 3DS, NINTENDO WII, NINTENDO WII U, and/or Nintendo Switch device manufactured by Nintendo Co., Ltd., of Kyoto, Japan, an XBOX 360, XBOX one, and/or the like manufactured by the Microsoft Corporation of Redmond, Wash., and/or the like.

In some embodiments, the computing device 100 may be a digital audio player such as the Apple IPOD, IPOD Touch, and IPOD NANO lines of devices, manufactured by Apple Computer of Cupertino, Calif. Some digital audio players may have other functionality, including, for example, a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and/or .mp4 MPEG-4 (H.264/MPEG-4 AVC) video file formats.

In some embodiments, the computing device 100 may be a tablet, for example, such as the IPAD line of devices by Apple; GALAXY TAB family of devices by Samsung; KINDLE FIRE, by Amazon.com, Inc. of Seattle, Wash.; and/or the like. In other embodiments, the computing device 100 may be an eBook reader, such as, for example, the KINDLE family of devices by Amazon.com, or the NOOK family of devices by Barnes & Noble, Inc. of New York City, N.Y.

While some non-limiting examples of various computing devices 100 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

UI Design Platform

Figure 2:
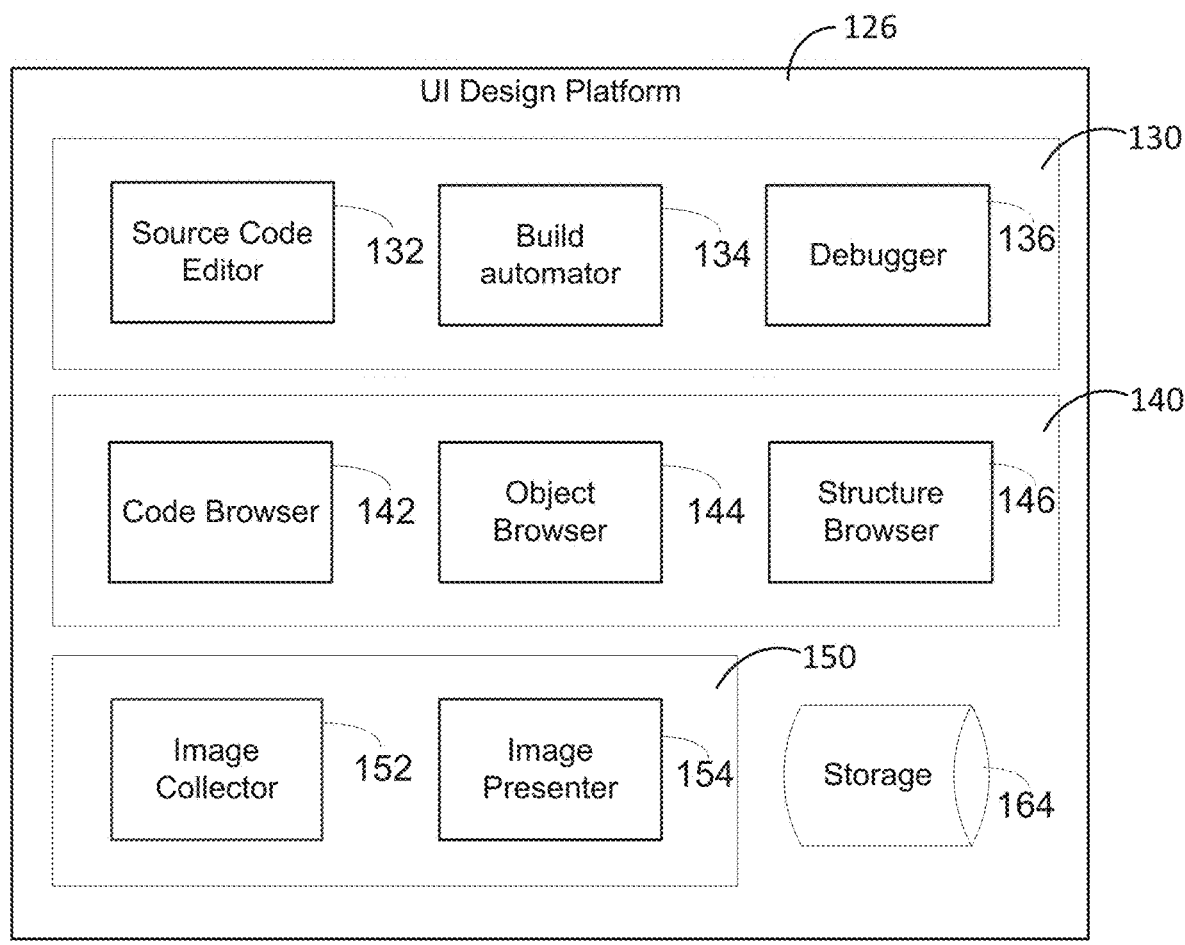
FIG. 2 is a block diagram depicting a user interface design platform, according to some embodiments.

Referring now to FIG. 2, a block diagram depicting the UI design platform 126 of FIG. 1 is shown in more detail, according to some embodiments. In some embodiments, the UI design platform 126 is a software program executed on the computing device 100. In other embodiments, the UI design platform 126 may be hosted on a cloud computing platform including one or more controllers, servers, and/or any other suitable computing devices that can be accessed by the computing device 100 over a network (e.g., the Internet) via the network interface 110. In some embodiments, the UI design platform 126 may include or be a part of a software development environment to facilitate software developers in building software applications for various different operating systems. For example, in some embodiments, the UI design platform 126 may be part of an integrated development environment (IDE), such as any of the RAD Studio product lines developed by Embarcadero Technologies. However, in other embodiments, the UI design platform 126 may be a separate design tool (e.g., computer program) that facilitates the development of graphical user interfaces (GUIs) for various different computer programs, applications, operating systems, devices, and/or interfaces.

For example, in some embodiments, the UI design platform 126 may facilitate software developers in designing a computer application or a GUI for the computer application (e.g., the GUI application 127). In some embodiments, the UI design platform 126 may facilitate in the design of the computer application for a particular type of computing device (e.g., a particular type of operating system) or for various different computing devices (e.g., various different operating systems). For example, in some embodiments, the UI design platform 126 may include virtualization software to virtually simulate different operating systems, computing devices, and/or platforms, so that the software developer can view and design GUIs having consistent look and feel across various devices, operating systems, and platforms.

In some embodiments, the UI design platform 126 may generate a plurality of versions of the computer application so that each version is tailored to execute or run on a different type of computing device, operating system, or platform. In various embodiments, such different versions may be created automatically or under control (e.g., user input) of the software developer. Accordingly, in some embodiments, a software developer may utilize the UI design platform 126 to design an application or a GUI for the application to run on more than one type of device, operating system, or platform. For a non-limiting example, the UI design platform 126 may facilitate in the design of the computer application to execute on a desktop computer running a Windows operating system and a smart phone running an Android operating system. However, in other embodiments, other types of devices and operating systems may be employed, for example, such as any of the devices and/or operating systems described above with reference to FIG. 1.

In more detail, as shown in FIG. 2, the UI design platform 126 may include a code generator 130, a developer interface 140, and an image manager 150, according to some embodiments. In some embodiments, the code generator 130 facilitates in the generation of software code and software builds for a computer application or a GUI for the computer application. For example, in some embodiments, the code generator 130 may include a source code editor 132. In some embodiments, the source code editor 132 may be a textual-based computer program configured to enable software developers to read, write, and edit the source code of a graphical user interface (GUI), a computer application, or any other suitable computer program. In some embodiments, the source code editor 132 may include features that simplify the generation of source codes, such as, for example, syntax checking, syntax highlighting, autocomplete, brace matching, and/or the like. In some embodiments, the source code editor 132 may include a structure editor that enables software developers to edit the structure of the source code using a syntax tree.

In some embodiments, the code generator 130 may further include a build automator 134, a debugger 136, and/or the like. In some embodiments, the build automator 134 facilitates the creation of a software build, including, for example, compiling code, packaging code, running automated tests, and/or the like. In some embodiments, the debugger 136 facilitates testing and debugging of the code, for example, by enabling various test functions such as querying processors, resolving symbols, interpreting expressions, single-stepping, program animation, breaking, tracking, verifying, reverse debugging, source-level debugging, symbolic debugging, low-level debugging, machine-language debugging, and/or the like. However, in other embodiments, the code generator 130 may include any number of suitable modules or functions to facilitate in the generation, build, and/or debugging of the source code associated with the computer application or GUI for the computer application.

In some embodiments, the developer interface 140 may provide an interface (e.g., GUI) to a software developer to interact with various graphics, components, and/or controls (collectively referred to as objects) to develop the computer application or GUI for the computer application. For example, in some embodiments, the developer may utilize the pointing device 118 to select and position various objects into a design area (or design surface) of a visual designer (e.g., a 2-dimensional and/or 3-dimensional designer, editor, and/or the like) for generating a GUI associated with the computer application via the developer interface 140. In some embodiments, the design area may include, for example, a window, form, card, pane, frame, 3-dimensional design area or surface, and/or the like, such that the objects arranged on the design area are shown at runtime as they would appear on a display window, mobile display screen, subsets (e.g., controls, portions of a window or screen, or the like) of a larger UI, or the like.

In some embodiments, the objects may include, but are not limited to, predefined visual objects, control objects (e.g., buttons, links, sliders, and/or the like), graphics (e.g., images), text, text fields, effects, buttons, animations, UI controls, and/or the like. In some embodiments, the UI design platform 126 may include one or more libraries or databases (e.g., storage 164) of various predefined, customized, and/or imported objects that may be used for creating the computer application or the GUI for the computer application. These objects may have various properties, each having a default or original property value that may be modified or changed by software developers as needed or desired.

For example, in some embodiments, predefined visual objects may be graphics that are used to create standard features in a computer application, such as a menu. In some embodiments, a software developer may also use the original objects, custom created objects, or imported objects to design the GUI for the computer application. In some embodiments, such custom created objects and imported objects may be added to the databases (e.g., libraries or storage 164) to be retrieved for later use, and may be stored with original or default property values that define the custom created objects and imported objects. Some non-limiting examples of various visual property types may include text fonts, styles, sizes, and colors. Other non-limiting example of various visual property types may include location (e.g., top, left, width, height, etc.), size, style, texture, color, effect, shape, image, animation, and/or the like. However, the property types can include various different types of properties other than visual properties, for example, such as behavioral properties that define controls (or functions) of objects, relational properties that define relationships between objects, and/or the like.

In more detail, in some embodiments, the developer interface 140 may include a code browser 142, an object browser 144, and a structure browser 146. In some embodiments, the code browser 142 enables software developers to browse, navigate, and visualize the source code for the GUI or the computer application. For example, the code browser 142 presents the source code in a window or section of the developer interface 140 to enable software developers to browse, navigate, and modify the source code. In some embodiments, the object browser 144 enables software developers to visualize the hierarchy of the objects (e.g., graphics, components, and/or controls) for the computer application or GUI for the computer application, including properties and events as well as other pertinent information associated with the objects. In some embodiments, the object browser also provides an interface in a window or section of the developer interface 140 to enable interaction with the objects and/or their properties. In some embodiments, the structure browser 146 enables software developers to visualize the structure of the source code by showing the code's classes, attributes, operations, and relationships among objects in a class diagram (e.g., a tree diagram) describing the parent-child relationship of the objects and controls with respect to other objects and controls.

Still referring to FIG. 2, in some embodiments, the image manager 150 enables developers to incorporate display scaling support features for the GUI, such that an image having a correct pixel size corresponding to the scale of the display screen or window is automatically provided by the GUI. In some embodiments, the image manager 150 may support compatibility with systems and devices that maintain fixed sized images contained in an image list. For example, as discussed above, some systems or devices (hereinafter referred to as "fixed sized image list systems") require that the images be maintained in an image list, with each of the images in the list having a fixed pixel size based on configuration, for example, such as 16×16 or 32×32. In some embodiments, the image manager 150 may similarly present images in a fixed sized list of images (referred to hereinafter as a virtual image list for purposes of distinction) that is similar to the image lists used by the fixed sized image list systems, such that the virtual image list is compatible with the fixed sized image list systems. For example, in some embodiments, the virtual image lists may be a real image list (e.g., containing fixed sized images in an index), such that various control functions provided by the fixed sized image list systems (e.g., image list functions provided via Microsoft Win32 API) may be utilized to manage the virtual image lists (e.g., creating/destroying image lists, adding/removing images, replacing/merging images, drawing images, dragging images, overlaying images, and/or the like).

However, unlike the fixed sized image list systems that can present only the fixed sized images contained in the image list, the virtual image list may be linked or connected to an image collection (or image container), such that the virtual image list can source images from the image collection and/or the image collection can provide images to the virtual image list, to re-populate the fixed sized images contained in the virtual image list with correctly sized images based on the display scale. For example, in some embodiments, the image collection (or image container) may store images having various sizes, such that the images in the virtual image list can be repopulated with corresponding images in the image collection having the correct size based on the display scale. In other embodiments, the image collection (or image container) may store images with no specific sizes (e.g., vector images, char code, and/or the like), such that images having the correct size corresponding to a display scale may be generated (e.g., from the vector images, char code, or the like) in response to a display scale change to repopulate the images in the virtual image list with the generated images from the image collection having the correct size based on the display scale. In various embodiments, the image collection may store any suitable related data using any suitable data structure to retrieve an image (e.g., binary formats with fixed sizes, SVG, XML, any suitable text format with a structure of vector objects, font name and char code, and/or any other suitable data), such that the images can be sourced or drawn from the image collection on Device Context.

However, the present disclosure is not limited thereto, and in other embodiments, the virtual image list may be compatible with other systems that serve fixed sized images from a source other than a traditional image list. For example, in some embodiments, the virtual image list may contain a single image, or may contain images in a structure different from a list (e.g., a lookup table). Further, in some embodiments, the images contained in the virtual image list may be bound to corresponding controls via mapping data other than an index to draw the images from the virtual image list, such that the images contained in the virtual image list may be referenced by an image mapping other than an index. In other embodiments, the image manager 150 may generate a mapping to a collection or set of items (e.g., an image collection) instead of a list (e.g., a virtual image list). For example, in some embodiments, instead of an ordered collection like a list, the mapping may be based on key-value pairs or other suitable mappings. Accordingly, while the virtual image list is provided as a non-limiting example for compatibility purposes with traditional image lists used by fixed sized image list systems, it should be appreciated that the present disclosure is not limited thereto, and the virtual image list may be variously modified to be compatible with any suitable system that serves fixed sized images from a source or collection, such that a correctly sized image is sourced from an image container to be drawn by the corresponding control instead of the fixed sized image.

For example, as shown in FIG. 2, in some embodiments, the image manager 150 may include an image collector 152 and an image presenter 154. In some embodiments, the image collector 152 generates an image collection that enables developers to store, scale, and draw images from the image collection. In some embodiments, the image collection may support any suitable image formats, for example, such as PNG images and 32 bpp bitmaps (e.g., a BMP with an alpha channel). In some embodiments, supporting 32 bpp bitmaps enable developers to configure how disabled images are rendered (e.g., grayscale and/or alpha-transparent) with changed or image-wide applied transparency, such that disabled images can be automatically generated from a normal image. That is, in some embodiments, an image can have its own alpha channel, but the image as a whole can be drawn at a desired transparency (e.g., 50%). In some embodiments, any non-32 bpp bitmap may be treated as a traditional colorkeyed bitmap with a single transparent color. However, in other embodiments, other suitable image formats may be employed, for example, such as JPEG, TIFF, GIF, and/or the like, with or without an alpha channel. In other embodiments, the image collection may support any suitable vector image formats, for example, such as SVG, CGM, WMF, EMF, and/or the like, with or without an alpha channel.

In various embodiments, the image collection can hold (e.g., store) a plurality of logical images, each of the logical images corresponding to an image (e.g., a logical image) contained at the index of the virtual image list. In some embodiments, each of the logical images (or at least some of the logical images) contained in the image collection can have a variety of differently sized versions. For example, when three image files having the names foo-16.png, foo-32.png, and bar-16.png are added to the image collection, two logical images are created, one for the foo logical image having a 16×16 version and a 32×32 version, and one for the bar logical image having a 16×16 version. However, each logical image may not have multiple versions of the same size, and all sizes of a particular logical image may have the same aspect ratio. For example, a particular logical image in the image collection can have multiple versions of different sizes (e.g., 16×16 version, a 32×32 version, and a 256×256 version) with each version having the same aspect ratio (e.g., 1:1), but may not have another version having the same size (e.g., another 16×16 version) or a different aspect ratio (e.g., a 16×32 version).

In some embodiments, the image presenter 154 generates an image list (e.g., a virtual image list) to present images sourced from the image collection at a desired (e.g., specific) pixel size according to the current scale of the display (e.g., current dots per inch (DPI) settings of the display screen or window, or other scale/size/resolution settings of a display module or component). In some embodiments, the virtual image list generated by the image presenter 154 may be similar to the image lists used by the fixed sized image list systems. For example, in some embodiments, the virtual image list generated by the image presenter 154 presents images that it holds in a specific size (e.g., specific height and width) via an index, but unlike the fixed sized images in the image lists used by the fixed sized image lists systems (that present the images with the fixed pixel size regardless of scaling), the virtual image list sources the images from the image collection based on a scaled pixel size corresponding to the displays scale. Thus, unlike image lists of the fixed sized image lists systems, the virtual image list can source a version of a logical image from the image collection having the correct pixel size depending on the scale of the display (e.g., display window, screen, or other display component or module), such that controls that are linked to the virtual image list can draw images with the correctly sized versions. For example, if the virtual image list specifies the height and width at 16×16 pixels at 100% scaling and the display screen or window is scaled to 200%, then the scaled pixel size may be calculated from a suitable algorithm that uses the specified 16×16 pixel size (e.g., height and width) defined at 100% scaling and the 200% display scale change as an input. In this example, in response to the display scale change of 200%, a scaled pixel size of 32×32 may be calculated from the fixed pixel size of 16×16 at 100% scaling and the display scale change of 200%, such that the virtual image list sources 32×32 versions of the logical images from the image collection. The virtual image list may then update (e.g., refresh or reload) such that the fixed sized images it contains are 32×32 versions of the logical images, and the controls may then draw the 32×32 versions of the logical images from the virtual image list. Accordingly, crisp, clear, and high quality images may be provided (or drawn) regardless of the current scaling of the display screen or window.

In some embodiments, the images presented (or drawn) via the virtual image lists are provided by the image collection based on an exact size match, if one is available. On the other hand, in some embodiments, if the image collection does not include a particular desired size version of a logical image, the image collection (or other suitable component) may generate and store (e.g., cache) the particular desired size version of the logical image from another version of the logical image. For example, in some embodiments, the image collection (or the virtual image list) may downscale a higher quality version of the logical image to generate the particular desired size version of the logical image. On the other hand, in some embodiments, if the image collection does not have a higher quality version to downscale, than a lower quality version of the logical image may be selected to be scaled up to generate the desired size version of the logical image. In this case, in some embodiments, the lower quality version may be the highest quality version from among the versions of the logical image stored in the image collection, or may be any suitable version that can be scaled up to generate the desired size version. In some embodiments, the generated version may be stored (or cached), such that the resizing is done once per logical image in the virtual image list.

For example, if the image collection holds a 16×16 version, a 32×32 version, and a 128×128 version of a logical image, and a 64×64 version of the logical image is needed based on the display scale, the 128×128 version may be downscaled to generate and store (e.g., cache) the 64×64 version. On the other hand, if a 256×256 version of the logical image is needed based on the display scale, the 128×128 version may be scaled up to generate and store (e.g., cache) the 256×256 version, since a version having a higher quality than 256×256 does not exist in the image collection and the 128×128 version is the highest quality version from among the versions in the image collection. However, in other examples, any suitable versions of the logical image in the image collection may be scaled up to generate the 256×256 version in the event that the image collection does not currently have the 256×256 version nor a higher quality version (e.g., a larger sized version). Accordingly, in various embodiments, any suitable downscaling or resampling algorithm capable of resizing images with minimal or low quality loss may be used, such that the highest quality image can be provided regardless of the scale of the display screen or window.

In some embodiments, an image collection may provide images to a plurality of virtual image lists. For example, in some embodiments, the image collection may include one or more specific images for each of a plurality of virtual image lists, such that each of the plurality of virtual image lists may source only the specific one or more images for that virtual image list from the image collection. In other embodiments, the image collection may include one or more specific images for a plurality of virtual image lists, such that each of the plurality of virtual image lists can source the same one or more specific images from the image collection. In some embodiments, the image collection is configured to store and scale the images that it holds, such that a virtual image list can source scaled images from the image collection in a specific format to build its own list of images with the required size as needed or desired.

Figure 3A:
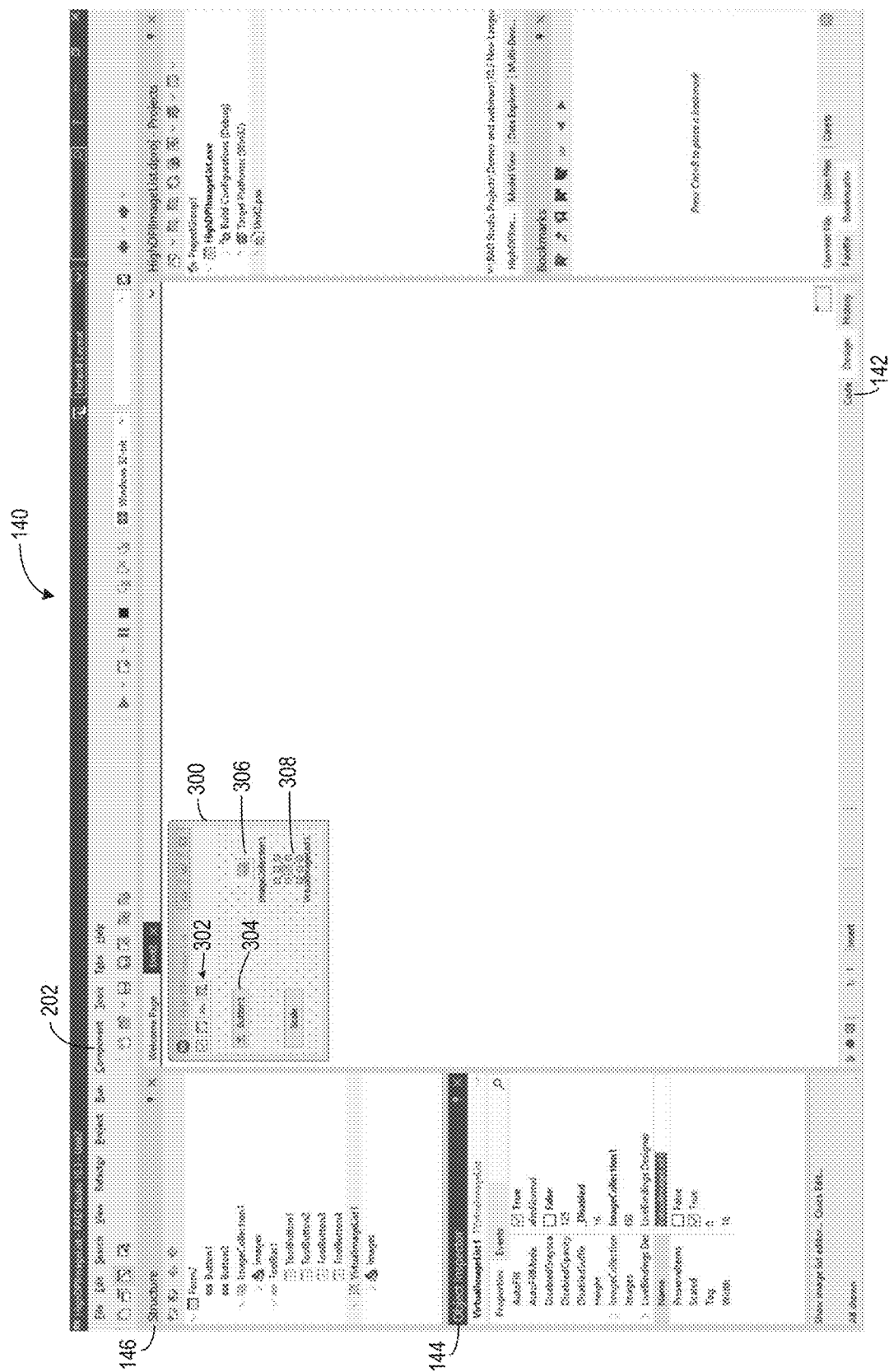
FIGS. 3A to 3C show portions of a developer interface, according to some embodiments.
Figure 3B:
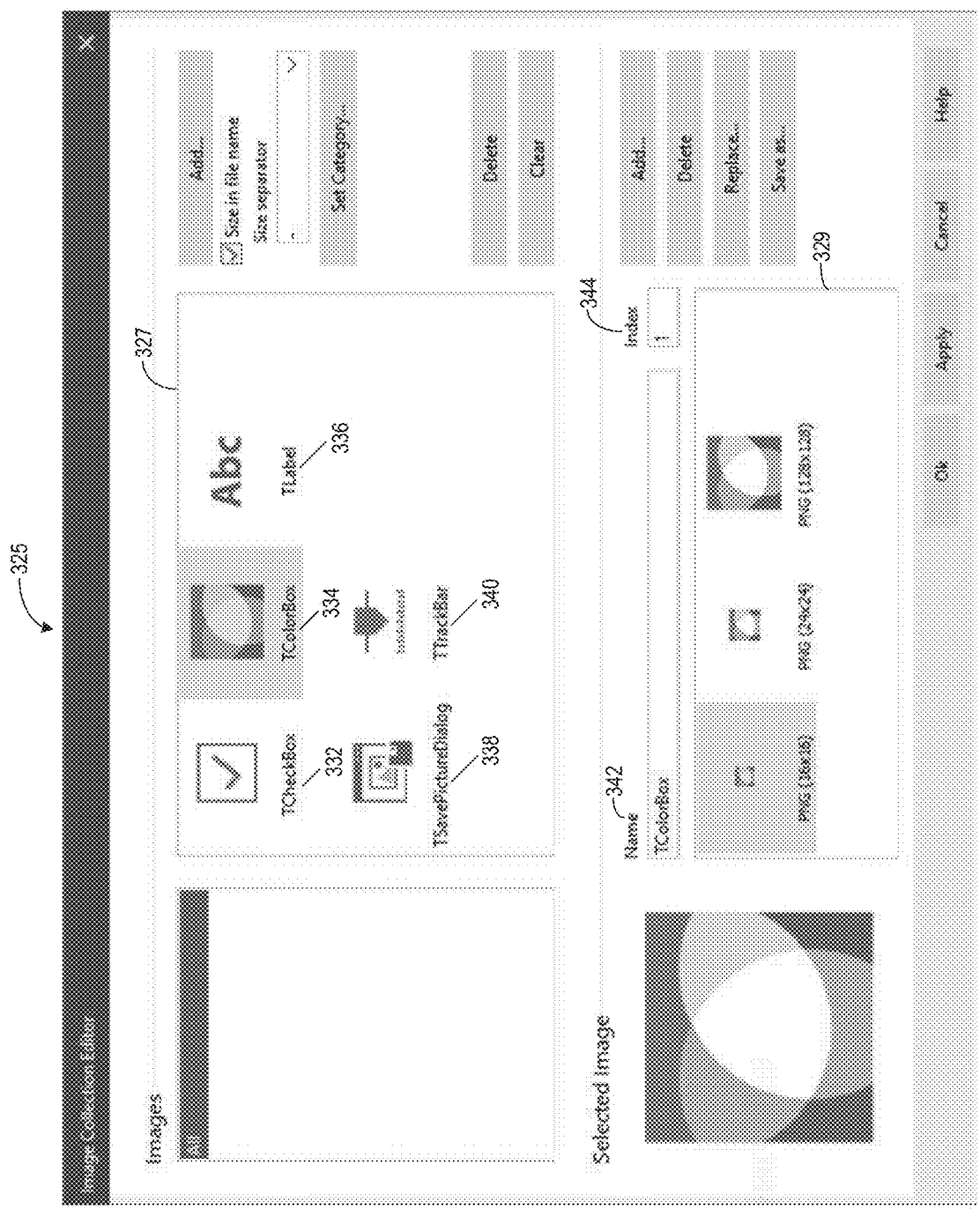
Figure 3C:
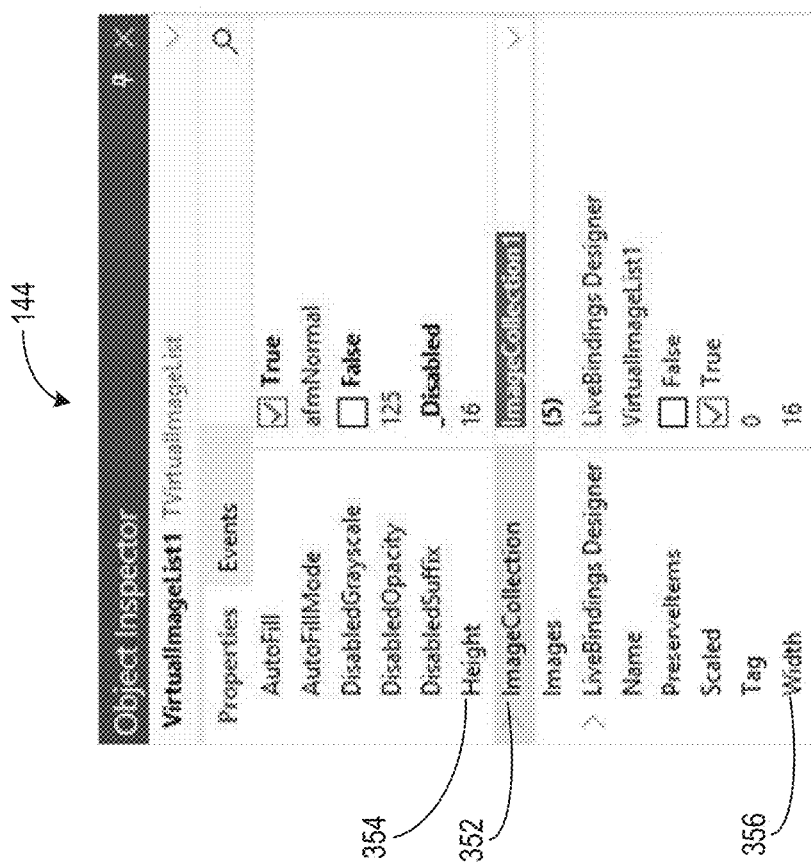

Referring now to FIGS. 3A to 3C, a developer interface 140 is shown according to an embodiment. FIG. 3A shows the developer interface 140, FIG. 3B shows an enhanced view of an image collector interface 325 of the developer interface 140, and FIG. 3C shows an enhanced view of an object browser 144 of the developer interface 140. In the non-limiting examples of FIGS. 3A to 3C, a simplified use case for designing a GUI via a design area (or design surface) 300 of a visual designer is shown. Hereinafter, a non-limiting example of the design area 300 is described and shown in the various figures as a form or form window 300 for convenience. However, the present disclosure is not limited thereto, and it should be appreciated that the visual designer may include any suitable design area (or design surface) 300, for example, such as a window, card, pane, frame, 3-dimensional design area or surface, and/or the like. As shown in FIG. 3A, the developer interface 140 may include a code browser 142, an object browser 144, and a structure browser 146 to enable a developer to design and generate a GUI for a computer application. In some embodiments, the developer interface 140 may further include a component library 202 that enables the developer to select and arrange various predefined, customized, or imported objects (e.g., graphics, components, and/or controls) into the form window 300 to generate the GUI for the computer application.

In a non-limiting example, as shown in FIG. 3A, a developer may select each of the objects 302 from the component library 202 and may arrange the objects 302 at a suitable location within the form window 300. In some embodiments, the form window 300 represents various components and elements on a GUI at runtime, and provides a simple interface for designing and building the GUI. For example, the objects 302 and 304 arranged within the form window 300 provides a visual representation of what the objects 302 and 304 would look like when the resulting GUI application is executed. The objects 302 may represent a menu 302 for the GUI, and each of the objects 302 may have a graphic or image displayed thereon. Object 304 may also be selected from the component library 202, which is a button control 304 to be used in the GUI for the computer application. Object 304 may also include a graphic or image displayed thereon. In other embodiments, the objects 302 and 304 may be imported directly into the form window 300, or may be added thereto from a template or another library other than the component library 202.

In various embodiments, the graphics and images displayed on each of the objects 302 and 305 may be drawn from an index of a virtual image list 308, and the virtual image list 308 may source images from an image collection 306. In various embodiments, the image collection 306 may be arranged within the form window 300 or may be placed within a data module, for example. However, the present disclosure is not limited thereto, and in other embodiments, the image collection 306 may be arranged on any suitable visual designer (e.g., a window, form, card, pane, frame, 3-dimensional design area or surface, and/or the like), or may be generated at runtime. In some embodiments, each of the graphics and images in the image collection 306 may be referred to by its index position in the image collection 306. Accordingly, each of the graphics and images in the image collection may include an index (e.g., image 1, image 5, etc.) representing its position within the image collection 306. However, the present disclosure is not limited thereto, and in other embodiments, the graphics and images in the image collection may be referred to by identifiers other than the index. For example, in some embodiments, some graphics or images may be bound to a particular control or other object in the GUI, such that these graphics and images may be drawn based on its association with the particular control or other object (e.g., an identifier of the control or other object) instead of based on index. In some embodiments, each of the graphics and images in the image collection 306 may further include a name or other unique identifier (e.g., tree). In some embodiments, the name or unique identifier may be further categorized into one or more categories and/or sub-categories (e.g., nature/tree, nature/tree/oak, or the like), which may assist with identifying the images to add to the image collection 306. In some embodiments, the graphics and images may maintain its name or unique identifier when sourced by the virtual image list, which may assist with identifying specific images in the virtual image list rather than relying on only the index.

For example, referring more particularly to FIG. 3B, in some embodiments, the developer interface 140 may provide an image collector interface 325 for interfacing with the image collector 152 to generate and configure the image collection 306. The image collector interface 325 provides a simple interface to add images to the image collection 306. For example, in some embodiments, the image collector interface 325 may be presented (or called upon) by selecting the image collection 306 (e.g., double-clicking the image collection 306). The developer can then enter, import, or otherwise add images to the image collection 306 using the image collector interface 325.

As shown in the non-limiting example of FIG. 3B, the image collection 306 holds logical images 327 for each of the graphics and images for the objects 302 and 304, as well as one or more different sized versions 329 of each logical image 327. For example, the logical images 327 include the logical images "TCheckBox" 332, "TColorBox" 334, "TLabel" 336, and "TSavePictureDialog" 338 that are shown on the objects 302, and the logical image "TTrackBar" 340 shown on the object 304, in this example. Further, selecting a logical image 327 enables the developer to add various different sized versions of the logical image. For example, when the logical image 334 is selected, the different sized versions 329 can be added for the logical image 334. The image collector interface 325 may display the name 342 of the logical image 334 and the index position 344 of the logical image 334 within the image collection 306.

Referring back to FIG. 3A, in some embodiments, a virtual image list 308 may be added to the form window 300, In some embodiments, the virtual image list 308 may be linked to a particular form window (e.g., 300), since some systems scale high DPI per display window. Thus, unlike the image collection 306 (which can be added anywhere such as the form window 300, a data module, or other visual designer), the virtual image list 308 may be added to the form window 300 such that the virtual image list 308 is linked to the particular form window 300 to detect scale changes for the window. However, the present disclosure is not limited thereto, and in other embodiments, the virtual image list 308 may be linked or otherwise connected to any suitable display component or module that is scalable, sizeable, or resolution responsive, such that correctly sized images can be provided responsive to changes in the scale, size, or resolution of the display component or module. In various embodiments, the virtual image list 308 may be linked to the image collection 306 located on the form window 300, or other image collection located elsewhere. For example, in various embodiments, the image collection 306 may be stored locally (e.g., in the user device) or may be stored remotely (e.g., on one or more servers, on a cloud based service, or the like), and the virtual image list 308 may access the image collection 306 via a system bus 128 or via a network (e.g., the Internet) to source images from the image collection 306.

For example, referring more particularly to FIG. 3C, the object inspector 144 of the developer interface 140 is shown when the virtual image list 308 is selected in the form window 300. In some embodiments, the object browser 144 enables developers to visualize various properties of selected objects or components within the form window 300 (e.g., the objects 302, the object 304, the virtual image list 308, and the like). For example, as shown in the non-limiting example of FIG. 3C, when the virtual image list 308 is selected, the object browser 144 displays various properties associated with the virtual image list 308. Some of the properties include, for example, ImageCollection 352, Height 354, and Width 356.

The ImageCollection 352 property enables the developer to link the virtual image list 308 to any suitable image collection. For example, the virtual image list 308 may be linked to the image collection 306 by setting the ImageCollection 352 property to point to a location or identifier (e.g., name) of the image collection 306. The Height property 354 and the Width property 356 sets the pixel size of the images used by the virtual image list 308. However, as discussed above, the pixel size set using the Height property 354 and the Width property 356 is the size of the images in pixels at 100% scaling. Thus, when the display window displaying the GUI corresponding to the form window 300 at runtime is scaled, the virtual image list 308 detects the scale change and requests a version of the logical image having the pixel size corresponding to the scale from the linked image collection 306. For example, when the display window linked to the virtual image list 308 is scaled to 200%, the virtual image list 308 calculates a scaled image size according to its fixed image size defined at 100% scaling (e.g., 16×16) to determine that it needs a 32×32 image from the image collection (e.g., 200% of a 16×16 image results in a scaled image size of 32×32). Accordingly, the virtual image list 308 associated with the particular display window may source 32×32 images from the linked image collection 306, if one is available, or may request a higher resolution version of the logical image (that may also be closest to the desired size from among the higher resolution versions, in some embodiments) to downscale to the desired size. In other embodiments, if the linked image collection 306 does not currently store the logical image at the desired size, the image collection 306 may downscale a higher resolution version of the logical image and may provide the downscaled version of the logical image to the virtual image list 308.

In various embodiments, the scale of the display screen or window may be detected based on native system APIs (e.g., operating system) of the device on which the resulting GUI is displayed. For example, in some embodiments, because the virtual image list 308 is linked to a particular display window corresponding to the form window 300 at runtime (or other suitable display component or module), when that display window is scaled, a notification may be received such that the display scale change can be detected. For example, some Windows operating systems provide an API (e.g., perMonitorv2) that enables applications to detect the current screen scale of one or more display devices (or monitors) or for one or more particular windows opened on the display device(s), even when the GUI is moved between displays (or monitors). In this case, because the virtual image list 308 is associated with (or linked to) a particular display window, when the display window is scaled, the virtual image list 308 can update (e.g., refresh, reload, regenerate, or the like) based on the scale to re-populate its fixed size images from the image collection 306 based on the new scale. Accordingly, a correctly sized, crisp, clear, and high quality image may be drawn from the virtual image list 308 regardless of the current scaling of the display screen or window.

Figure 4:
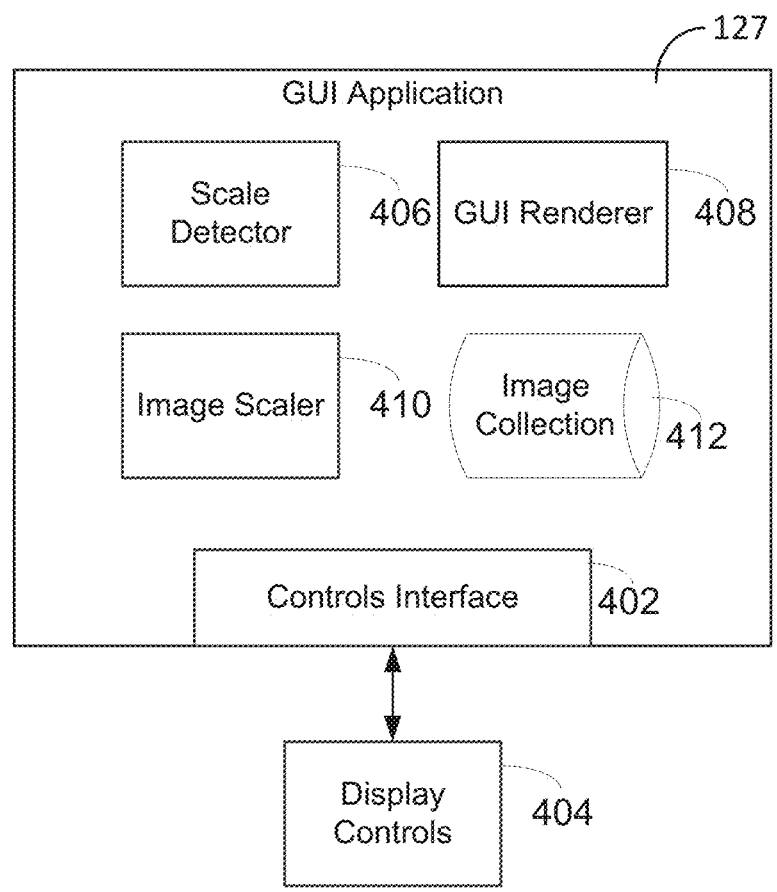
FIG. 4 is a block diagram of a GUI application, according to some embodiments.

FIG. 4 is a block diagram of a GUI application 127 that is downloaded, installed, or otherwise accessible from a user device (e.g., the computing device 100), such that the GUI application 127 may display a corresponding GUI on the user device. In some embodiments, the GUI application 127 may be built using the user design platform 126. In other embodiments, the GUI application 127 may be built using any suitable design platform or design tool. In various embodiments, the GUI application 127 may be a desktop application, a mobile application, a web application, a webpage, or the like. While FIG. 1 shows the computing device 100 having a software instance of both the UI design platform 126 and the GUI application 127, the present disclosure is not limited thereto. For example, the GUI application 127 may be accessed, downloaded, or installed by the computing device 100 without the software instance of the UI design platform 126 installed thereon. Thus, in various embodiments, the software instance of the UI design platform 126 may not be necessary for the GUI application 127 to operate according to the various embodiments described herein.

For example, in various embodiments, the user device (e.g., the computing device 100) may execute or otherwise access the GUI application 127, such that the corresponding GUI is displayed on a display window or display screen associated with the user device. In various embodiments, the corresponding GUI may include various controls (e.g., toolbars, buttons, menu items, and/or the like), and the controls may have a corresponding graphic or image displayed on or near the controls. In some embodiments, the graphics or images of the controls may be managed via an image list (e.g., a virtual image list) such that the graphics or images are drawn from an index of the image list. In some embodiments, the GUI application 127 may further include an image collection 412 (or image container) linked to the image list, such that the image list can source different sized images from the image collection 412 based on the scale of the display window or display screen.

In more detail, referring to FIG. 4, in some embodiments, the GUI application 127 may include a controls interface 402, a scale detector 406, a GUI renderer 408, an image scaler 410, and an image collection 412 (or image container). In some embodiments, the controls interface 402 may be communicably connected to display controls 404 associated with a particular type of user device on which the corresponding GUI is displayed, such that the GUI application 127 can access or utilize various native functionalities, protocols, and/or APIs associated with the hardware, software, and/or operating system of the particular user device. For example, in some embodiments, if the user device is a Windows desktop, the display controls 404 may include various Microsoft Windows APIs (e.g., Win32API) for managing image list functions, image list processing handles (e.g., HIMAGELIST), display scale monitoring behavior or functions (e.g., perMonitorv2), and/or the like, such that the features and functionalities described herein may be compatible with various devices configured to execute or otherwise display the corresponding GUI. Accordingly, in some embodiments, the image list (or virtual image list) used to display the graphics and images of the corresponding GUI may be a real image list, such that the user device can use its native functionalities, protocols, and/or APIs to draw images from the image list.

However, unlike conventional image lists, in some embodiments, the image list or virtual image list of the GUI application 127 is linked or connected to the image collection 412. The image collection 412 stores a plurality of logical images, each of the logical images corresponding to an image in the virtual image list. In some embodiments, at least some of (or each of) the logical images stored in the image collection 412 includes a plurality of different sized images, with each of the plurality of different sized images having a different size from other ones of the plurality of different sized images, but with the same aspect ratio as each of the other ones of the different sized images. In some embodiments, the virtual image list sources images from the image collection 412, and re-populates its index of images with the images sourced from the image collection 412 having the correct size in response to a display scale change.

For example, in some embodiments, the scale detector 406 may detect when a display window or screen displaying the corresponding GUI changes scale. For example, in some embodiments, the scale detector 406 may receive a notification via an API of the user device (e.g., via perMonitorv2) of a display scale change in response to the display window or screen associated with the corresponding GUI changing its display scale. In some embodiments, in response to the display scale change, the scale detector 406 may calculate a scale change ratio corresponding to the previous display scale and the changed display scale. In some embodiments, the scale detector 406 may provide the scale change ratio to the GUI renderer 408, and/or may store the scale change ratio for later retrieval.

In some embodiments, the GUI renderer 408 may identify an image list (or virtual image list) associated with the display window or screen in response to the display scale change. In some embodiments, the GUI renderer 408 may calculate a scaled pixel size based on the display scale change. For example, in some embodiments, the GUI renderer 408 may calculate the scaled pixel size based on the scale change ratio and the pixel size of the images indexed by the virtual image list. In some embodiments, the GUI renderer 408 may identify an image collection (e.g., the image collection 412) linked to the virtual image list. For example, in some embodiments, the GUI renderer 408 may identify an identifier (e.g., name or location) of the image collection 412 from a property (e.g., the image collection property) associated with the virtual image list that defines the link or connection to the image collection 412. In various embodiments, the image collection 412 may be stored locally on the user device, or may be stored remotely and accessible by the GUI application 127 via a network (e.g., the Internet).

In some embodiments, the GUI renderer 408 may access the image collection 412 to identify whether the image collection 412 currently stores images having the scaled pixel size for each logical image in the virtual image list. In some embodiments, if the image collection 412 does not have a particular logical image having the scaled pixel size, the image scaler 410 may generate the particular logical image at the scaled pixel size. For example, in some embodiments, the image scaler 410 may retrieve another image corresponding to the particular logical image from the image collection 412, and may downscale the other image to have the scaled pixel size. For example, in some embodiments, the image scaler 410 may retrieve a larger sized image corresponding to the particular logical image, and may downscale the larger sized image according to the scaled pixel size to generate a downscaled image having the scaled pixel size. In some embodiments, the larger sized image may be the closest larger sized image that is selected to downscale. For example, if the image collection 412 holds a 16×16 image, a 64×64 image, and a 128×128 image for a particular logical image, and the scaled pixel size is for a 32×32 image, the image scaler 410 may retrieve the 64×64 image to downscale in order to generate the downscaled image, since the 64×64 image is greater than the scaled pixel size of 32×32, but closer to the 32×32 size than the 128×128 image. However, in other embodiments, the image scaler 410 may choose to downscale any of the larger images having a larger pixel size than the scaled pixel size. While FIG. 4 shows the image scaler 410 as a separate component of the GUI application, the present disclosure is not limited thereto, and in other embodiments, the image scaler 410 may be a part of the image collection 412, the virtual image list, or any other suitable components or modules (e.g., the scale detector 406, the GUI renderer 408, or the like). Accordingly, a higher quality image may be provided (or drawn) when compared to systems that upscale from a smaller sized image to present the smaller sized image using more pixels to appear physically larger.

In some embodiments, if the image scaler 410 generates the downscaled image, the downscaled image may be cached or stored (e.g., in the image collection 412), such that the resizing is done once per logical image in the virtual image list. For example, in some embodiments, the downscaled image may be stored in the image collection 412 and categorized for the particular logical image associated with the generated downscaled image. In various embodiments, the GUI renderer 408 may re-populate the images indexed in the virtual image list with the images stored in the image collection 412 having the scaled pixel size, such that the virtual image list is updated (e.g., refreshed or reloaded) with indexed images having the correct size corresponding to the display scale change. Accordingly, in some embodiments, the GUI renderer 408 may refresh or reload the corresponding GUI displayed on the display window or screen, such that the controls of the corresponding GUI draws from the updated virtual image list having the correctly sized images.

Figure 5:
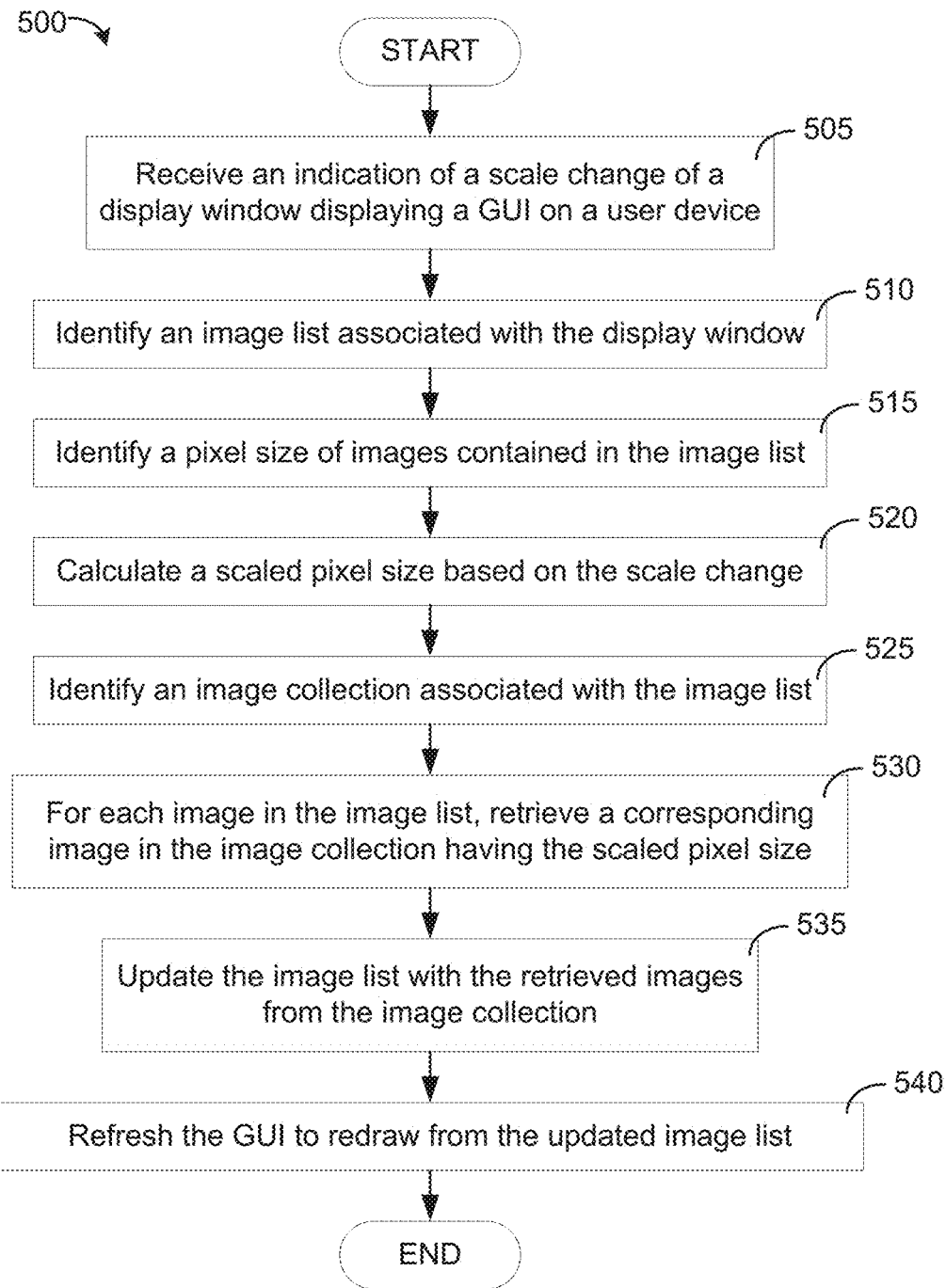
FIG. 5 is a flow diagram of a method for displaying different sized images from an image list based on scaling of a display, according to some embodiments.

FIG. 5 is a flow diagram of a method 500 for displaying different sized images from an image list based on scaling of a display, according to some embodiments. The functionalities of the method or process 500 may be implemented using, or performed by, the components detailed herein in connection with FIGS. 1-4. In brief overview, the method 500 of FIG. 5 may be used to display different sized images from a fixed size image list according to scaling changes of a display window or screen. For example, the method 500 of FIG. 5 may be performed by the GUI application 127 of FIG. 4 in response to a scaling change of a display window or screen displaying a corresponding GUI of the GUI application 127.

In more detail, a GUI (e.g., of a GUI application 127) is displayed on a display window or screen of a display device associated with a user device (e.g., the computing device 100). The GUI may include various controls (e.g., toolbars, buttons, menu items, and/or the like), and the controls may have a corresponding graphic or image displayed at (e.g., on or near) the controls. In some embodiments, the graphics and images for the controls of the GUI may be drawn from an image list (e.g., a virtual image list), and the image list may be linked or otherwise associated with the display window or screen displaying the GUI. Thus, when the scale of the display window or screen is changed, the GUI may detect the scale change from a notification or alert generated by the user device (e.g., via a system API, such as perMonitorv2).

Accordingly, in response to the scale change the method 500 starts, and at operation 505, an indication of the scale change of the display window or screen displaying the GUI is received. For example, in some embodiments, the scale detector 406 may detect, receive, or otherwise identify the indication of the scale change via any suitable native system API, function, or component provided by the user device (e.g., via perMonitorv2 API) indicating the scale change of the display window or screen. In some embodiments, the scale detector 406 may determine how the scale was changed. For example, in some embodiments, the scale detector 406 may calculate a scale change ratio corresponding to the previous display scale and the changed display scale. In some embodiments, the scale change ratio may be used to calculate a scaled pixel size for the graphics and images to be displayed at the correct size based on the scale change.

At operation 510, an image list (e.g., a virtual image list) associated with the display window or screen is identified. For example, in some embodiments, the GUI renderer 408 may identify the image list associated with the GUI displayed on the display window or screen. In some embodiments, the image list may be a real image list including an index of images (e.g., logical images), and each of the images may have a fixed pixel size at 100% scaling. In some embodiments, the image list may be linked to an image collection, such that the image list can populate its images (e.g., logical images) from the image collection.

At operation 515, a pixel size of the images contained in the image list is identified. For example, in some embodiments, the GUI renderer 408 may identify the pixel size properties (e.g., Width and Height properties) for the images in the image list. At operation 520, a scaled pixel size is calculated based on the scale change. For example, in some embodiments, the GUI renderer 408 may calculate the scaled pixel size based on the scale change ratio and the pixel size properties of the images in the image list. For a non-limiting example, assuming that the current pixel size properties of the images in the image list indicate a height property of 16 and a width property of 16 at 100% scaling, and the scale change ratio indicates that the display was scaled to 200% (e.g., 2:1), then the GUI renderer 408 may calculate the scaled pixel size by combining (e.g., multiplying) the current pixel size (e.g., 16×16) and the scale change ratio (e.g., 2). Accordingly, in this example, the scaled pixel size calculated by the GUI renderer 408 may be 32×32 pixels at 200% display scaling. Similarly, in some embodiments, fractional display scale changes may be supported. For example, assuming that the display scale is changed to 110%, then the GUI renderer 408 may calculate the scaled pixel size based on the defined pixel size of 16×16 at 100% scaling and the fractional scale change to 17.6×17.6 (e.g., 16×16 multiplied by 1.1). In this case, in some embodiments, the GUI renderer 408 may round the fractional scaled pixel size to the nearest whole number (e.g., 17 or 18).

At operation 525, an image collection (or image container) associated with the image list is identified. For example, in some embodiments, the GUI renderer 408 may identify an image collection linked or connected to the image list from one or more properties of the image list (e.g., indicating a link to a unique identifier or location of an image collection). In various embodiments, the image collection stores a plurality of logical images, each of the logical images corresponding to a logical image in the index of the image list. In some embodiments, at least some of (or each of) the logical images stored in the image collection includes a plurality of different sized images, with each of the plurality of different sized images having a different size from other ones of the plurality of different sized images and the same aspect ratio as the other ones of the different sized images. In various embodiments, the image collection may be stored locally on the user device, or may be stored remotely (e.g., on a remote server) and accessible by the GUI (or GUI application 127) via a network (e.g., the Internet).

At operation 530, for each image (e.g., logical image) in the image list, a corresponding image having the scaled pixel size is retrieved from the image collection. For example, as discussed in more detail with reference to FIG. 6, in some embodiments, the corresponding image having the scaled pixel size may be provided from the image collection, if one is currently available (e.g., stored) in the image collection, or a downscaled image having the scaled pixel size may generated and provided from the image collection, if the image corresponding to the scaled pixel size is not currently available in the image collection.

At operation 535, the image list is updated (e.g., re-populated) with the retrieved images from the image collection. For example, in some embodiments, the GUI renderer may re-populate each of the indexed images (e.g., 16×16 images at 100% scaling) in the image list with the scaled pixel size images (e.g., 32×32 images) sourced from the image collection. Accordingly, at operation 540, the GUI is refreshed to redraw images from the updated (e.g., re-populated) image list and the method may end. For example, in some embodiments, the GUI renderer 408 may cause the GUI to refresh or reload such that the updated image list is associated with the scaled display window or screen, and the controls of the GUI redraw the graphics or images from the updated image list.

Figure 6:
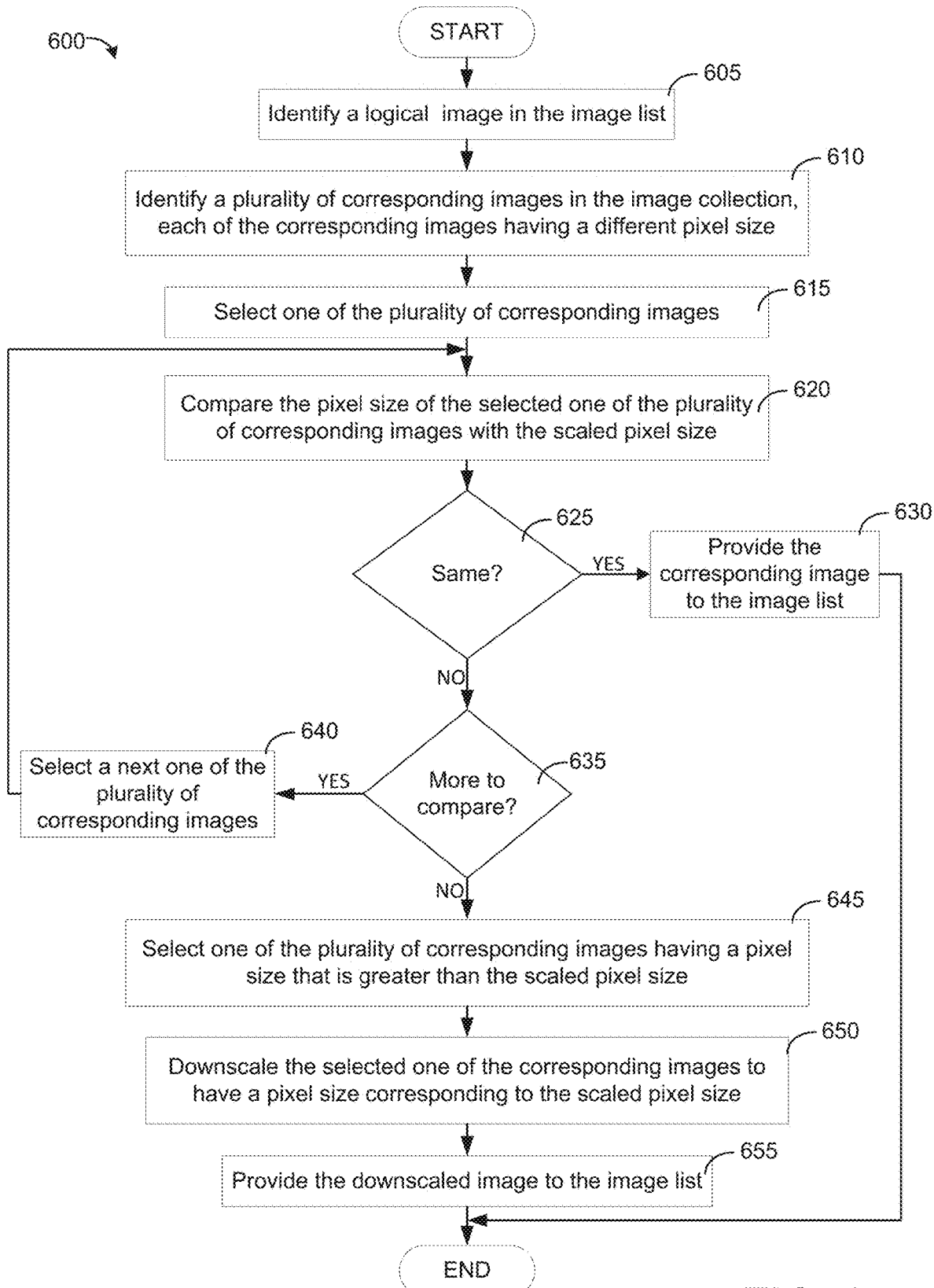
FIG. 6 is a flow diagram of a method for updating images in an image list sourced from an image collection, according to some embodiments.

FIG. 6 is a flow diagram of a method for updating images in an image list sourced from an image collection, according to some embodiments. The functionalities of the method or process 600 may be implemented using, or performed by, the components detailed herein in connection with FIGS. 1-4. In brief overview, the method 600 of FIG. 6 may be used to retrieve a corresponding image in the image container having a corresponding scaled pixel size, which is similar to or the same as operation 530 described with reference to FIG. 5. For example, the method 600 of FIG. 6 may be performed by the GUI application 127 of FIG. 4 in response to a scaling change of a display window or screen displaying a corresponding GUI of the GUI application 127.

In more detail, at operation 530 of FIG. 5, for each image (e.g., logical image) in the image list, a corresponding image having the scaled pixel size is retrieved from the image collection via the method 600 of FIG. 6. In this case, if the image collection currently stores the corresponding image having the scaled pixel size, the corresponding image is simply provided such that the image list can update its indexed images with the correctly sized images from the image collection. On the other hand, if the corresponding image having the scaled pixel size is not currently stored in the image collection, a downscaled image may be generated and stored, such that the image list updates its indexed images with the correctly sized images from the downscaled images in the image collection.

Accordingly, the method 600 starts, and at operation 605, a logical image in the image list is identified. For example, in some embodiments, the image list may include one or more logical images in an index, each of the logical images having a fixed pixel size at 100% scaling. At operation 610, a plurality of corresponding images are identified in the image collection, each of the corresponding images having a different pixel size. For example, in some embodiments, each of the corresponding images may correspond to a different sized version of the logical image identified at operation 605. In some embodiments, each of the corresponding images may have the same aspect ratio, but may have a different pixel size than each of the other corresponding images.

At operation 615, one of the corresponding images are selected, and at operation 620, the pixel size of the selected image is compared with a scaled pixel size. For example, in some embodiments, the GUI renderer 408 may compare the pixel size of the selected image with the scaled pixel size calculated at operation 520 of FIG. 5. In some embodiments, if the pixel size of the selected image is the same as (or equal to) the scaled pixel size at operation 625 (e.g., YES), then the selected image is provided to the image list at operation 630, such that the image list can be updated with images having the scaled pixel size. In this case, the method 600 may end, or corresponding images for another logical image in the image list, if any, may be compared and provided. On the other hand, if the pixel size of the selected image is not the same as the scaled pixel size at operation 625 (e.g., NO), then the GUI renderer 408 may determine if there are more corresponding images to compare at operation 635 for the logical image identified at operation 605. If there are more corresponding images to compare at operation 635 (e.g., YES), then a next one of the plurality of corresponding images is selected at operation 640, and the method loops back to operation 620, such that the pixel sizes of each of the other ones of the plurality of corresponding images can be compared to the scaled pixel size until a match is found at operation 625 and provided at operation 630.

On the other hand, if none of the pixel sizes matches the scaled pixel size such that there are no more corresponding images to compare at operation 635 (e.g., NO), then a downscaled image having a pixel size corresponding to the scaled pixel size may be generated. For example, in some embodiments, the downscaled image may be generated from one of the other plurality of corresponding images to have the scaled pixel size. In some embodiments, the one of the other plurality of corresponding images may have a pixel size that is greater than the scaled pixel size. In some embodiments, the one of the other plurality of corresponding images may also have a pixel size from among the greater pixel sizes that is closest to the scaled pixel size. Accordingly, at operation 645, one of the plurality of corresponding images having a pixel size that is greater than and closest to the scaled pixel size is selected. In other embodiments, any of the plurality of corresponding images having a pixel size that is greater than the scaled pixel size may be selected for downscaling.

At operation 650, the selected one of the plurality of corresponding images is downscaled to have a pixel size corresponding to the scaled pixel size. In some embodiments, the downscaled image may be cached or stored (e.g., in the image collection) such that the downscaled image is available for future use. At operation 655, the downscaled image is provided to the image list and the method 600 may end, or corresponding images for another logical image in the image list, if any, may be compared and provided. Accordingly, in some embodiments, at operation 535 of FIG. 5, the image list may be updated (e.g., re-populated) with the images from the image collection as provided via method 600.

What is claimed is:

1. At least one non-transitory computer-readable media comprising computer-readable instructions, such that when executed, causes a processor to display a graphical user interface (GUI) comprising:
    an image list associated with a display component of a display device, the image list having an index of logical images, each of the logical images having a fixed pixel size;
    an image container connected to the image list, the image container comprising a plurality of different size versions of at least some of the logical images; and
    one or more control objects, each of the control objects configured to draw a corresponding image from the index of logical images of the image list,
    wherein the GUI is configured to update the index of logical images of the image list with the different size versions sourced from the image container in response to a scale change of the display component.

2. The at least one non-transitory computer-readable media of claim 1, wherein each of the control objects is configured to draw a corresponding different size version of the logical images in response to the update of the image list.

3. The at least one non-transitory computer-readable media of claim 1, wherein each of the different size versions of the logical images have the same aspect ratio, and each different size version of a corresponding logical image has a different pixel size than those of other different size versions of the corresponding logical image.

4. The at least one non-transitory computer-readable media of claim 3, wherein the GUI is configured to:
    compare the pixel size of each of the different size versions of a corresponding logical image with a scaled pixel size corresponding to the scale change; and
    determine whether the different size versions of the corresponding logical image include a version having the scaled pixel size.

5. The at least one non-transitory computer-readable media of claim 4, wherein the GUI is further configured to:
    identify a version from among the different size versions of the corresponding logical image that includes the scaled pixel size; and
    in response to identifying the version having the scaled pixel size, re-populate a corresponding image in the index of the image list with the version having the scaled pixel size.

6. The at least one non-transitory computer-readable media of claim 4, wherein the GUI is further configured to:
    determine that none of the different size versions of the corresponding logical image includes the scaled pixel size;
    downscale one of the different sized versions of the corresponding logical image having a pixel size that is greater than the scaled pixel size to generate a downscaled version of the corresponding logical image having the scaled pixel size; and
    re-populate a corresponding image in the index of the image list with the downscaled version having the scaled pixel size.

7. The at least one non-transitory computer-readable media of claim 1, wherein the image list is configured to modify at least one of the different size versions of the logical images sourced from the image container to be drawn semi-transparent or in grayscale.

8. A system for displaying graphics on controls of a GUI, the system comprising:
    a display device configured to display the GUI;
    one or more processors; and
    memory coupled to the one or more processors and storing instructions that, when executed by the one or more processors, cause the one or more processors to:
        receive an indication of a scale change of a display component of the display device, the display component displaying the GUI;

identify an image list associated with the display component, the image list having an index of logical images, each of the logical images having a fixed pixel size;
identify an image container connected to the image list, the image container comprising a plurality of different size versions of at least some of the logical images;
update each entry of the logical images in the image list with the different size versions sourced from the image container in response to the scale change of the display component; and
redraw a graphic for a control object in the GUI from the updated image list, the graphic corresponding to one of the different size versions in the updated image list.

9. The system of claim 8, wherein each of the different size versions of the logical images have the same aspect ratio, and each different size version of a corresponding logical image has a different pixel size than those of other different size versions of the corresponding logical image.

10. The system of claim 9, wherein the instructions further cause the one or more processors to:
identify a pixel size of the logical images in the index of the image list;
calculate a scaled pixel size based on the scale change and the pixel size of the logical images; and
retrieve the different size versions of the logical images from the image container corresponding to the scaled pixel size.

11. The system of claim 10, wherein to retrieve the different size versions of the logical images from the image container, the instructions further cause the one or more processors to:
compare the pixel size of each of the different size versions of a corresponding logical image with the scaled pixel size; and
determine whether the different size versions of the corresponding logical image include a version having the scaled pixel size.

12. The system of claim 11, wherein the instructions further cause the one or more processors to:
identify a version from among the different size versions of the corresponding logical image that includes the scaled pixel size; and
in response to identifying the version having the scaled pixel size, re-populate a corresponding image in the index of the image list with the version having the scaled pixel size.

13. The system of claim 11, wherein the instructions further cause the one or more processors to:
determine that none of the different size versions of the corresponding logical image includes the scaled pixel size;
downscale one of the different sized versions of the corresponding logical image having a pixel size that is greater than the scaled pixel size to generate a downscaled version of the corresponding logical image having the scaled pixel size; and
re-populate a corresponding image in the index of the image list with the downscaled version having the scaled pixel size.

14. The system of claim 8, wherein the instructions further cause the one or more processors to modify at least one of the different size versions of the logical images sourced from the image container.

15. A method for displaying graphics on controls of a GUI, the method comprising:
receiving, by a processor, an indication of a scale change of a display component of a display device, the display component displaying the GUI;
identifying, by the processor, an image list associated with the display component, the image list having an index of logical images, each of the logical images having a fixed pixel size;
identifying, by the processor, an image container connected to the image list, the image container comprising a plurality of different size versions of at least some of the logical images;
updating, by the processor, the index of the image list with the different size versions sourced from the image container in response to the scale change of the display component; and
redrawing, by the processor, a graphic for a control object in the GUI from the updated image list, the graphic corresponding to one of the different size versions in the updated image list.

16. The method of claim 15, wherein each of the different size versions of the logical images have the same aspect ratio, and each different size version of a corresponding logical image has a different pixel size than those of other different size versions of the corresponding logical image.

17. The method of claim 16, further comprising:
identifying, by the processor, a pixel size of the logical images in the index of the image list;
calculating, by the processor, a scaled pixel size based on the scale change and the pixel size of the logical images; and
retrieving, by the processor, the different size versions of the logical images from the image container corresponding to the scaled pixel size.

18. The method of claim 17, wherein to retrieve the different size versions of the logical images from the image container, the method further comprises:
comparing, by the processor, the pixel size of each of the different size versions of a corresponding logical image with the scaled pixel size; and
determining, by the processor, whether the different size versions of the corresponding logical image include a version having the scaled pixel size.

19. The method of claim 18, further comprising:
identifying, by the processor, a version from among the different size versions of the corresponding logical image that includes the scaled pixel size; and
in response to identifying the version having the scaled pixel size, re-populating, by the processor, a corresponding image in the index of the image list with the version having the scaled pixel size.

20. The method of claim 18, further comprising:
determining, by the processor, that none of the different size versions of the corresponding logical image includes the scaled pixel size;
downscaling, by the processor, one of the different sized versions of the corresponding logical image having a pixel size that is greater than the scaled pixel size to generate a downscaled version of the corresponding logical image having the scaled pixel size; and
re-populating, by the processor, a corresponding image in the index of the image list with the downscaled version having the scaled pixel size.

21. The method of claim 15, further comprising modifying, by the processor, at least one of the different size versions of the logical images sourced from the image container.

\* \* \* \* \*